(12) United States Patent
Khot et al.

(10) Patent No.: US 8,279,261 B2
(45) Date of Patent: Oct. 2, 2012

(54) EMAIL BASED SCHEDULING MECHANISM FOR CONFERENCE CALLS

(75) Inventors: Gautam Khot, Bangalore (IN); Prithvi Ranganath, Bangalore (IN); Raghuram Belur, Bangalore (IN); Sandeep Lakshmipathy, Bangalore (IN)

(73) Assignee: LifeSize Communications, Inc., Austin, TX (US)

( * ) Notice: Subject to any disclaimer, the term of this patent is extended or adjusted under 35 U.S.C. 154(b) by 488 days.

(21) Appl. No.: 12/555,950

(22) Filed: Sep. 9, 2009

(65) Prior Publication Data

US 2011/0058013 A1 Mar. 10, 2011

(51) Int. Cl.
*H04N 7/14* (2006.01)

(52) U.S. Cl. .............. 348/14.09; 348/14.01; 348/14.08

(58) Field of Classification Search .......... 348/14.01, 348/14.08, 14.09; 379/93.21, 202.01
See application file for complete search history.

(56) References Cited

U.S. PATENT DOCUMENTS

| | | | |
|---|---|---|---|
| 5,642,156 A | 6/1997 | Saiki | |
| 6,064,976 A | 5/2000 | Tolopka | |
| 6,195,117 B1 | 2/2001 | Miyazaki | |
| 7,009,943 B2 | 3/2006 | O'Neil | |
| 7,023,465 B2 | 4/2006 | Stephens, Jr. | |
| 7,046,779 B2 | 5/2006 | Hesse | |
| 2002/0064136 A1 | 5/2002 | O'Neil | |
| 2004/0199580 A1 | 10/2004 | Zhakov et al. | |
| 2005/0015444 A1 | 1/2005 | Rambo | |
| 2006/0062367 A1 | 3/2006 | Christenson et al. | |
| 2006/0256738 A1 | 11/2006 | Kenoyer et al. | |
| 2007/0070940 A1 | 3/2007 | Vander Veen et al. | |
| 2007/0115348 A1 | 5/2007 | Eppel et al. | |
| 2007/0263825 A1 | 11/2007 | Shah et al. | |
| 2008/0033778 A1 | 2/2008 | Boss et al. | |
| 2008/0063173 A1 | 3/2008 | Sarkar et al. | |

*Primary Examiner* — Suhan Ni
(74) *Attorney, Agent, or Firm* — Meyertons Hood Kivlin Kowert & Goetzel, P.C.; Jeffrey C. Hood (57) ABSTRACT

A system and method for a management server to schedule a conference call. The management server may manage conferencing equipment, including a schedule for the managed conferencing equipment. The management server may receive scheduling information for the conference call, which may specify a time and two or more endpoints for the conference call. At least one of the endpoints may be managed by the management server. The management server may determine whether the conference call is possible, based on the scheduling information and the schedule for the managed conferencing equipment. If the conference call is determined to be possible, the conference call may be scheduled, in which case the management server may enter the scheduling information into the schedule for managed conferencing equipment.

21 Claims, 6 Drawing Sheets

EMAIL BASED SCHEDULING MECHANISM FOR CONFERENCE CALLS

FIELD OF THE INVENTION

The present application relates to videoconferencing, and more specifically to an email based mechanism for scheduling conference calls.

DESCRIPTION OF THE RELATED ART

A videoconference is a conference call involving two or more participants (endpoints) communicating by visual and audio means. There are several ways a user may typically launch a video call.

A user may access selected video equipment by means of an input mechanism supported by the device, enter the address of the destination, and invoke the call procedure.

A user may make use of a proprietary application specific to a particular network management suite application that manages all the video endpoints to book the video equipment needed for a conference and ask the management application to launch the call.

A user may request that an administrator launch a videoconference between multiple endpoints. The administrator, in turn, may do so by means of a remote interface capability provided by the endpoint, such as an HTTP web interface, or a CLI interface.

Scheduling a videoconference, including setting up a videoconference in advance, can be one of the most challenging aspects of videoconferencing. This is at least partially because scheduling mechanisms typically involve a steep learning curve. It is a difficult enough problem that in many organizations, users may commonly be forced to resort to asking for support, e.g., from an administrator or tech support.

One common method for scheduling videoconferences involves installing a plug-in on a scheduling server which allows the scheduling server to create, delete, and set properties for mailboxes, and using this ability to create a mailbox for each video endpoint. The plug-in also provides a mechanism for the scheduling server to check each of these mailboxes for schedules and/or meetings and create a corresponding entry in its own database.

This method also requires a plug-in for mail clients, to assist users in creating and modifying video meetings, which could require that every computer system from which scheduling capability is desired have connectivity to the scheduling server.

One significant problem with this method is that a mail server is normally one of an organization's most important and secure resources, and is expected to have little or no downtime. Installing plug-ins on the mail server(s) could result in unwarranted downtimes. Many organizations are averse to taking such a risk.

In addition, installing specific mail client plug-ins presents several problems. For one, simply deploying a specific mail client plug-in and training personnel in its use can be a problem for an organization, regardless of the size of the organization. In addition, most plug-in problems that do occur will involve network topology/accessibility problems regarding connecting with a management server. Troubleshooting such problems can be a particularly daunting task for an administrator. Finally, using a plug-in which is specific to a particular mail client forces users to use the mail client on which the plug-in is supported.

The above method also typically has trouble with scheduling external participants in a videoconference. External participants may include participants from a different network, who will connect over an endpoint that is not managed by an organization's management suite. If it is desired to schedule a videoconference with an external participant, an administrator must first create a specific entry for the external participant. In addition, if any of the details of the video connection (e.g., IP address or ISDN number) change at the time of the videoconference, the administrator must again become involved.

All in all, videoconference scheduling is a difficult problem, for which the current techniques and solutions are inadequate. As such, improvements in the field are desirable.

SUMMARY OF THE INVENTION

Various embodiments are presented of a method for a management server to schedule a conference call. The method may be implemented by a computer readable memory medium, including program instructions executable to perform the method, in some embodiments. Additionally, the method may be implemented by a management server, e.g., a system including a processor, a network port coupled to the processor for coupling with a network, and a memory medium coupled to the processor which stores program instructions executable by the processor to perform the method.

A management server may manage one or more pieces of conferencing equipment. For example, the management server may manage one or more videoconferencing endpoints, audioconferencing endpoints, multipoint control unit equipment, and/or other conferencing equipment. Management of the conferencing equipment may include maintaining a schedule, e.g., a scheduling database on the management server, for all of the managed conferencing equipment. Such a schedule might include conferencing appointments (e.g., times and endpoints involved) for the managed conferencing equipment, and in some cases scheduled maintenance (e.g., down times) capabilities, and/or other information for the managed conferencing equipment.

The management server may receive scheduling information for a conference call. The management server may receive the scheduling information by email, e.g., the scheduling server may include (or have access to, e.g., on a mail server) a dedicated scheduling mailbox configured to receive emails with scheduling information. An email with scheduling information may be received from a user, either directly (e.g., from the user to the scheduling mailbox) or indirectly (e.g., the user may send an email with scheduling information to a mailbox of one or more pieces of managed conferencing equipment, and the mailbox of the conferencing equipment may forward the email to the scheduling mailbox), according to various embodiments.

The scheduling information may include a time and two or more endpoints for the conference call. At least one of the endpoints to be included in the conference call may be managed by the management server. In some embodiments, the scheduling information may include additional information, such as additional endpoints or other conferencing equipment (such as a multipoint conferencing unit and/or gateway), a duration of the conference call, locations of the endpoints, participant contact information, and/or any other desired information. In several embodiments, the scheduling information may indicate a preference for which equipment may host the conference call; for example, the order in which conferencing equipment is included in the scheduling information may indicate an order of preference.

The management server may determine whether the conference call is possible, based on the scheduling information and the schedule for the managed conference equipment. Determining whether the conference call may include checking the schedule for the managed conferencing equipment for any problems which would interfere with the conference call. For example, the management server may check if any of the conferencing equipment to be used in the conference call has a conflict with another scheduled conference call, or is scheduled to undergo downtime during the conference call. Additionally, the management server may check that the managed conferencing equipment (either the specified/requested conferencing equipment, or in some embodiments any available managed conferencing equipment) is capable of hosting the conference call. In some embodiments, this may include checking whether a combination of multiple pieces of equipment (e.g., multiple multipoint conferencing units, multiple endpoints with multipoint capability, or some combination) is capable of hosting the call, e.g., in a cascaded arrangement.

As noted above, the scheduling information may include a preference for one (or more) pieces of conferencing equipment to host the conference call. For example, the scheduling information may indicate, e.g., by the order in which the conferencing equipment is listed, that that is the order of preference for choosing a host. In this case, the management server may determine whether the preferred host is suitable to host the conference call. If the preferred host is unsuitable, an alternate host may be determined. If an order of preference is indicated among multiple endpoints or other conferencing equipment, the determined host may be the first piece of conferencing equipment which is suitable to host the conference call. Alternatively, if none of the specified equipment is suitable to host the conference call, or if no preference is indicated, the management server may determine an appropriate host based on one or more predetermined settings, e.g., settings which have been chosen by an administrator.

If it is determined that the conference call is not possible (e.g., because it is not possible to host the conference call with the managed conferencing equipment, because there is a conflict with some of the specified conferencing equipment, or for any reason), the management server may send a message (e.g., an email) to the user from which the scheduling information originated, indicating the reason(s) that it was not possible to schedule the conference call.

If the conference call is determined to be possible, the management server may schedule the conference call. This may include entering the scheduling information in the schedule for managed conferencing equipment.

Once the conference call has been scheduled, a confirmation message (e.g., a confirmation email) may be sent to each participant in the conference call. The confirmation message may confirm that the conference call has been scheduled, and/or include a conference ID for the scheduled conference call. The confirmation message may also indicate some or all of the equipment (e.g., endpoints, MCUs, gateways, etc.) which is scheduled to be included in the conference call. The confirmation message may also include a request to specify a method of participation in the conference call. For example, each participant might respond with an IP address or DNS name, an ISDN number, a PSTN number, a SIP URL, an OCS URL, or some other mechanism to join the conference. Alternatively, if the management server already has default or preferred method-of-participation information for a given endpoint, the participant at that endpoint may not need to respond to the request.

In some embodiments, one or more endpoints may be external endpoints, which will be used by external participants. An external endpoint may be an endpoint including conferencing equipment which is not managed by the management server. In this case, the external participant may need to respond with an indication of their method of participation. The management server may receive this indication (which may indicate to the management server that the external participant is using conferencing equipment which is not managed by the management server). Based on the indicated method of participation, the management server may create an external equipment entry (e.g., in the schedule for managed conferencing equipment). The external equipment entry may allow the management server to include the external endpoint (including the conferencing equipment not managed by the management server) in the conference call. Additionally, in some embodiments the external equipment entry may be usable in scheduling future conference calls; for example, if scheduling information for a future conference call were to include the external endpoint as one of the endpoints in the conference call, the management server might look up the external equipment entry to determine the default or preferred method of participation for that external endpoint.

If the management server does receive any response(s) to the requests for methods of participation, the management server may make any changes or additions indicated by the response(s) in the schedule for managed conferencing equipment. In other words, the management server may update the scheduling information for the conference call in the schedule for managed conferencing equipment based on receiving an indication of a method of participation from one or more participants in the conference call.

In some embodiments, the management server may also automatically initiate conference calls scheduled for the managed conferencing equipment. Thus, based on the scheduling information in the schedule for the managed conferencing equipment, the management server may automatically (e.g., without requiring user input) initiate the conference call at the specified time. This may include sending commands to one or more endpoints (e.g., videoconferencing systems) and/or multipoint units to establish connections between the participants according to the specified methods of participation. Other means of initiating the conference call are also possible.

BRIEF DESCRIPTION OF THE DRAWINGS

A better understanding of the present invention may be obtained when the following Detailed Description is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

U.S. Patent Application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a PROM, EPROM, EEPROM, flash memory, or magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, server, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

FIG. 1

Figure 1:
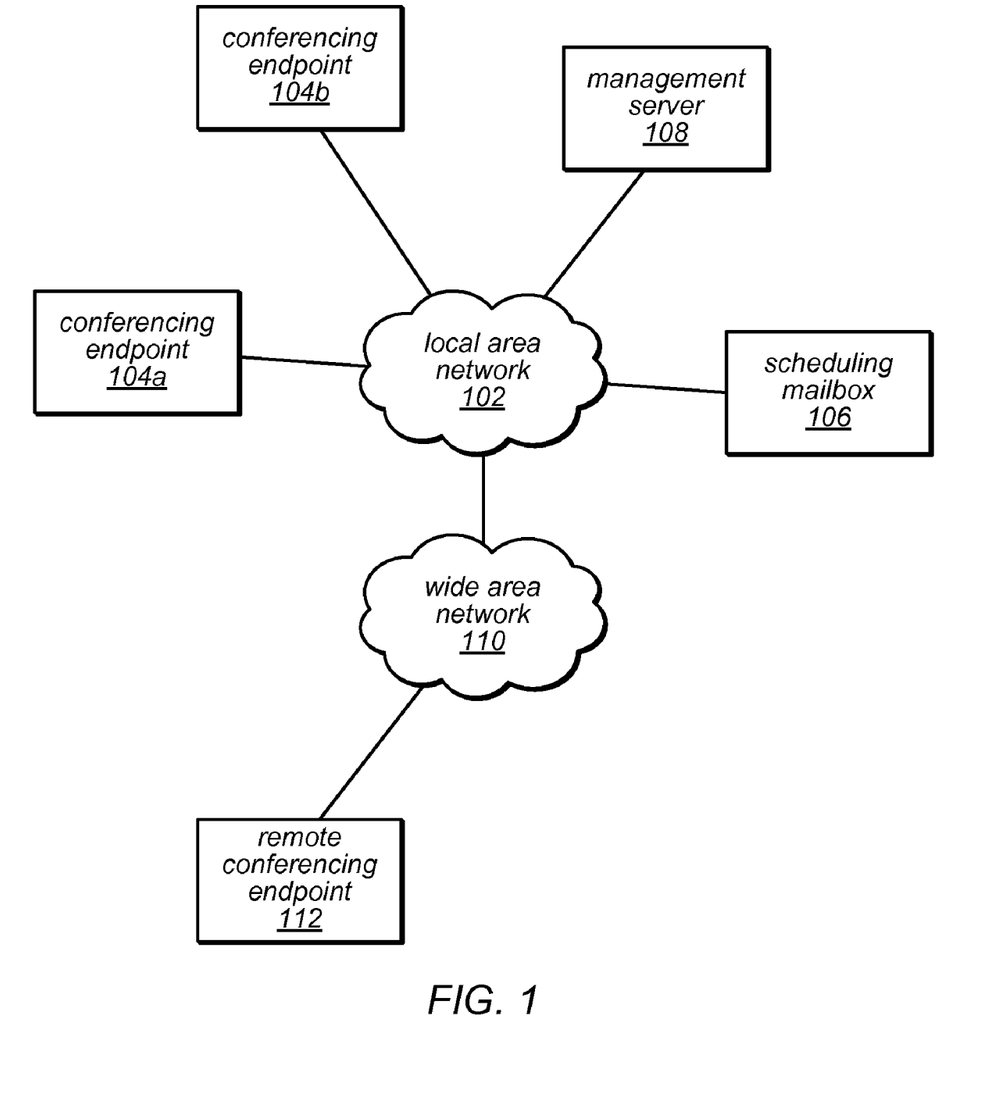
FIG. 1 illustrates a local area network, which is coupled to a wide area network, according to one embodiment.
Figure 2:
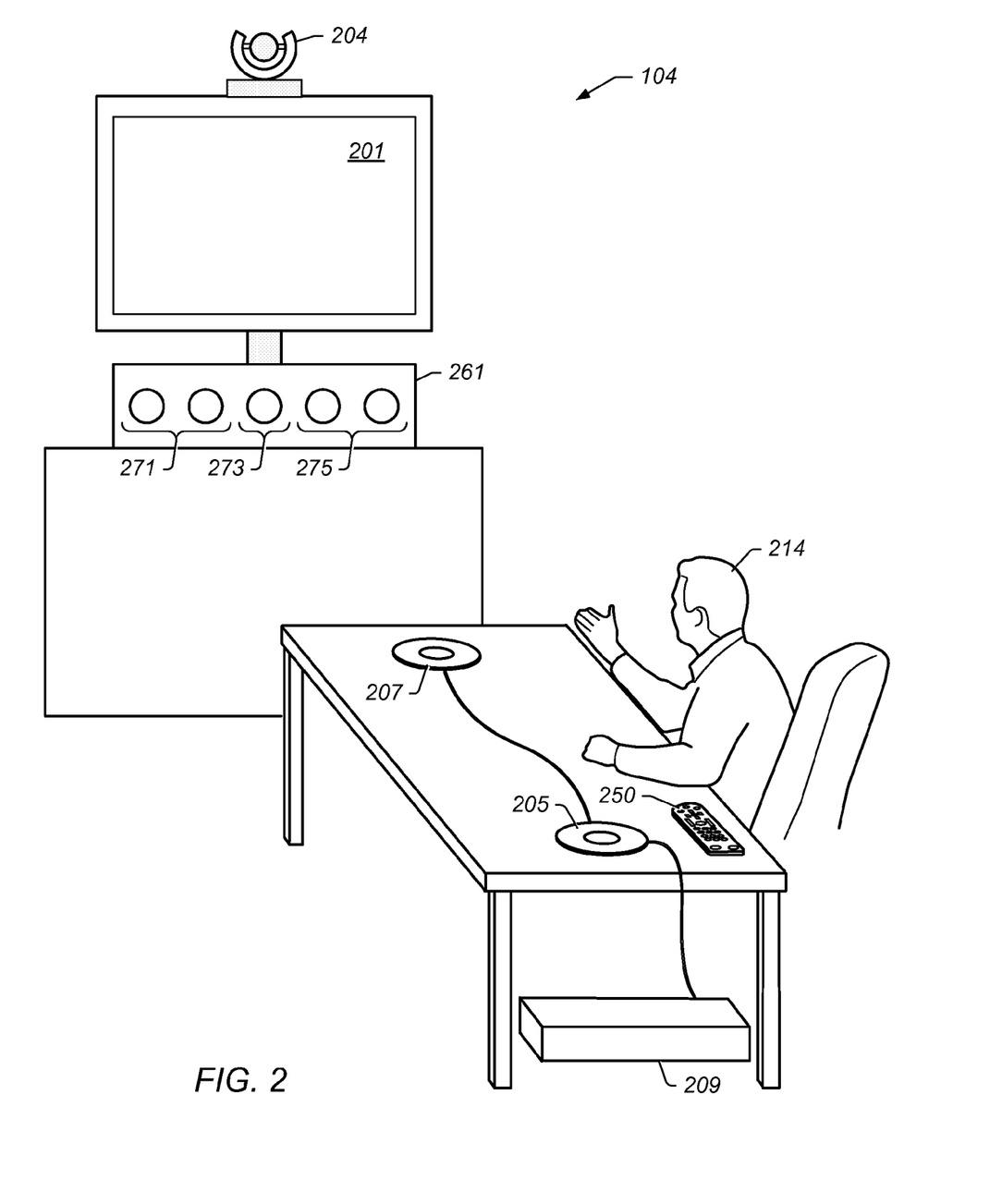
FIG. 2 illustrates a videoconferencing endpoint, according to one embodiment.

FIG. 1 illustrates an exemplary system comprising a local area network 102 coupled to a wide area network 110. The local area network 102 may include one or more conferencing endpoints 104. The conferencing endpoints 104 may each include one or more pieces of conferencing equipment; for example, a conferencing endpoint 104 might be an audio only endpoint (e.g., including one or more speakerphones) or a videoconferencing endpoint (e.g., including both video and audio equipment). An exemplary videoconferencing endpoint is shown in FIG. 2 and described below with respect thereto.

The local area network 102 may also comprise a management server 108 for managing the various conferencing equipment on the local area network 102. The management server 108 may be a server computer system, e.g., including a processor, a network port for coupling to the network, and a memory medium including program instructions executable by the processor. For example, the management server may include one or more management applications (e.g., software) for managing the conferencing equipment. The managed conferencing equipment may include the video and/or audio conferencing equipment at each endpoint 104. The managed conferencing equipment may also include other equipment on the local area network 102 which is used in video and/or audioconferencing, which may not be located at an endpoint 104, e.g., other multipoint equipment, gateways, etc. The management server 108 may include, or have access to (e.g., on a mail server on the local area network 102), a scheduling mailbox 106. The scheduling mailbox 106 may receive scheduling information for all of the conferencing equipment managed by the management server 108. An email forwarding mechanism by which this may be easily accomplished is described in further detail below with respect to FIG. 3.

In the sense used in the instant application, 'managing' one or more pieces of conferencing equipment may include creating and maintaining a schedule of the planned use(s) of the managed conferencing equipment, and in some embodiments also initiating such uses. For example, in one embodiment, managing conferencing equipment may include storing a schedule (e.g., a database schedule) including scheduling information for each scheduled videoconference (or audioconference) including the time, duration, and equipment which will be used for that videoconference, and initiating each scheduled conference at the appointed time. Management of a piece of conferencing equipment (e.g., a conferencing endpoint) may also include providing other functions or services related to the equipment; for example, managing may include periodically upgrading or updating the equipment (e.g., providing software updates), monitoring SNMP traps from an endpoint, monitoring call statistics for ongoing calls, and/or providing other functions.

In one embodiment the local area network 102 is a dedicated videoconferencing network comprising various videoconferencing endpoints, and optionally one or more audioconferencing endpoints (e.g., speakerphones). In another embodiment, the local area network 102 may be a general purpose LAN, including various standard network devices (servers, hubs, routers, switches, gateways, etc.), as well as videoconferencing and/or audioconferencing endpoints.

The local area network 102 may be coupled to a wide area network (WAN) 112, which may be the Internet, according to one embodiment. One or more remote conferencing endpoints 112 may be coupled to the WAN, e.g., either directly or through another local area network (not shown). In some embodiments, one or more of the remote conferencing endpoints 112 may include conferencing equipment managed by the management server 108. For example, this may be possible through use of a virtual private network (VPN), or, in other cases, by setting specific network traffic rules on a remote network to forward management related traffic to the management server 108. Alternatively, or in addition, one or more of the remote endpoints 112 may not be managed by the management server 108; that is, one or more of the remote endpoints 112 may be external endpoints comprised in another network (e.g., a network of a different organization), and may include external conferencing equipment (e.g., which is not managed by the management server 108). According to some embodiments of the present invention, it may be possible to schedule and initiate conference calls between one or more local endpoints 104 and one or more remote endpoints 112.

It will be noted that the system shown in FIG. 1 is exemplary only, and other arrangements are also possible. For example, while FIG. 1 shows two local conferencing endpoints 104, there could be only one local endpoint, or more than two local endpoints. Likewise, while FIG. 1 shows one remote endpoint 112, there could instead be no remote endpoints 112 (e.g., for a videoconference between two local endpoints), or there could be a plurality of remote endpoints. In addition, the LAN 102 may also include other conferencing-specific and/or general purpose devices, such as switches, hubs, routers, gateways, a service provider, and plain old telephone system (POTS) telephones, among others, as desired. For example, the conferencing endpoints 104 may be coupled to the local area network 102 via an Ethernet interface or through gateways (not shown). Gateways may each include firewall, network address translation (NAT), packet filter, and/or proxy mechanisms, among others.

FIG. 2

FIG. 2 illustrates an exemplary videoconferencing endpoint 104, e.g., an exemplary embodiment of a videoconferencing participant location, also referred to as a videoconferencing system or videoconferencing unit. The videoconferencing system 104 may have a system codec 209 to manage both a speakerphone 205/207 and videoconferencing hardware, e.g., camera 204, speakers 271, 273, 275, etc. The speakerphones 205/207 and other videoconferencing system components may be coupled to the codec 209 and may receive audio and/or video signals from the system codec 209.

In some embodiments, the participant location may include camera 204 (e.g., an HD camera) for acquiring images (e.g., of participant 214) of the participant location. Other cameras are also contemplated. The participant location may also include a display 201 (e.g., an HDTV display). Images acquired by the camera 204 may be displayed locally on the display 201 and may also be encoded and transmitted to other participant locations in the videoconference.

The participant location may also include a sound system 261. The sound system 161 may include multiple speakers including left speakers 271, center speaker 273, and right speakers 275. Other numbers of speakers and other speaker configurations may also be used. The videoconferencing system 104 may also use one or more speakerphones 205/207 which may be daisy chained together.

In some embodiments, the videoconferencing system components (e.g., the camera 204, display 201, sound system 261, and speakerphones 205/207) may be coupled to a system codec 209. The system codec 209 may be placed on a desk or on a floor. Other placements are also contemplated. The system codec 209 may receive audio and/or video data from a network, such as a LAN (local area network) or the Internet. The system codec 209 may send the audio to the speakerphone 205/207 and/or sound system 261 and the video to the display 201. The received video may be HD video that is displayed on the HD display. The system codec 209 may also receive video data from the camera 204 and audio data from the speakerphones 205/207 and transmit the video and/or audio data over the network to another conferencing system. The conferencing system may be controlled by a participant through the user input components (e.g., buttons) on the speakerphones 205/207 and/or remote control 250. Other system interfaces may also be used.

In various embodiments, a codec may implement a real time transmission protocol. In some embodiments, a codec (which may mean short for "compressor / decompressor") may comprise any system and/or method for encoding and/or decoding (e.g., compressing and decompressing) data (e.g., audio and/or video data). For example, communication applications may use codecs to convert an analog signal to a digital signal for transmitting over various digital networks (e.g., network, PSTN, the Internet, etc.) and to convert a received digital signal to an analog signal. In various embodiments, codecs may be implemented in software, hardware, or a combination of both. Some codecs for computer video and/or audio may include MPEG, Indeo™, and Cinepak™, among others.

In some embodiments, the videoconferencing system 104 may be designed to operate with normal display or high definition (HD) display capabilities. The videoconferencing system 104 may operate with network infrastructures that support T1 capabilities or less, e.g., 1.5 mega-bits per second or less in one embodiment, and 2 mega-bits per second in other embodiments.

Note that the videoconferencing system(s) described herein may be dedicated videoconferencing systems (i.e., whose purpose is to provide videoconferencing) or general purpose computers (e.g., IBM-compatible PC, Mac, etc.) executing videoconferencing software (e.g., a general purpose computer for using user applications, one of which performs videoconferencing). A dedicated videoconferencing system may be designed specifically for videoconferencing, and is not used as a general purpose computing platform; for example, the dedicated videoconferencing system may execute an operating system which may be typically streamlined (or "locked down") to run one or more applications to provide videoconferencing, e.g., for a conference room of a company. In other embodiments, the videoconferencing system may be a general use computer (e.g., a typical computer system which may be used by the general public or a high end computer system used by corporations) which can execute a plurality of third party applications, one of which provides videoconferencing capabilities. Videoconferencing systems may be complex (such as the videoconferencing system shown in FIG. 2) or simple (e.g., a user computer system with a video camera, microphone and/or speakers). Thus, references to videoconferencing systems, endpoints, etc. herein may refer to general computer systems which execute videoconferencing applications or dedicated videoconferencing systems.

FIG. 3

Figure 3:
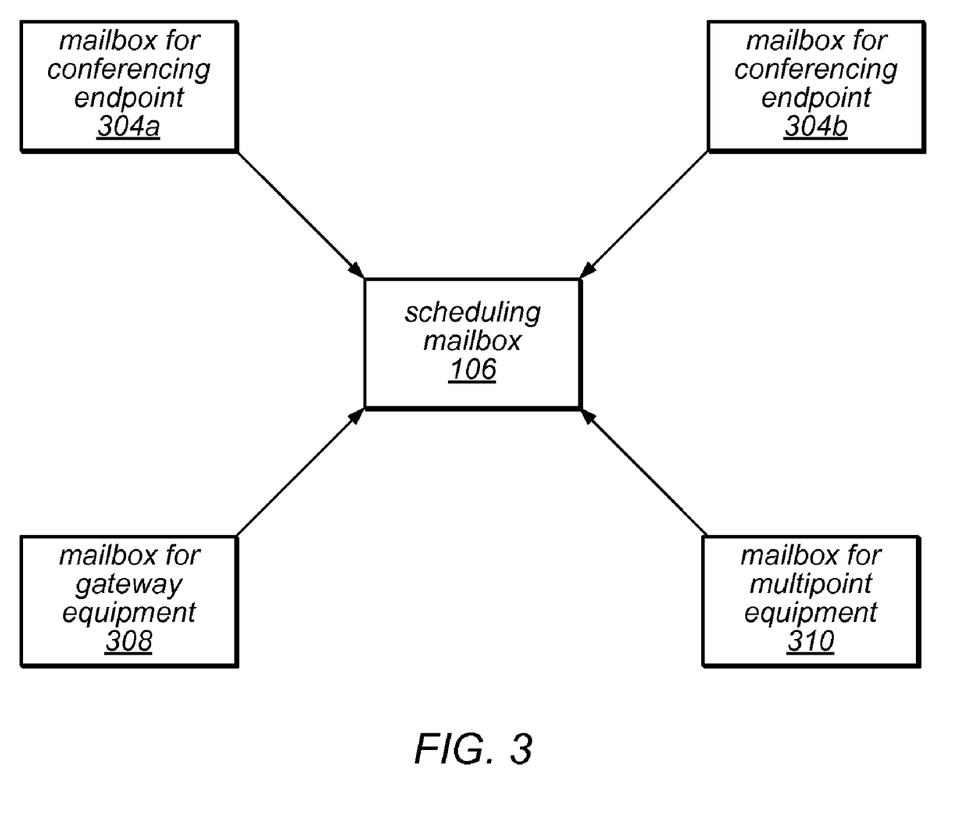
FIG. 3 illustrates email/schedule forwarding from videoconferencing equipment to a scheduling mailbox.

FIG. 3 is a diagram illustrating schedule/email forwarding logistics according to one embodiment of the present invention. In some embodiments, each piece of conferencing equipment managed by a management server may have a dedicated mailbox, e.g., to maintain the various schedules in which that conferencing equipment is involved. For example, infrastructure equipment such multipoint units and gateways, as well as the conferencing equipment at each endpoint, may each have a mailbox. Although in some embodiments each individual piece of conferencing equipment at a given endpoint may have its own mailbox, it may be desirable to configure each videoconferencing system (endpoint) 104 to be represented and managed by a single mailbox, since the various conferencing equipment at a given endpoint 104 (e.g., as described with respect to FIG. 2) may typically be used together as an integrated videoconferencing unit. Thus, as shown in FIG. 3, there may be mailboxes 304a, 304b for endpoints 104a, 104b, as well as mailboxes for infrastructure equipment such as gateway equipment 308 and multipoint equipment 310. Alternatively, there may be mailboxes for other equipment instead of or in addition to the equipment shown in FIG. 3, or there may be less equipment and fewer mailboxes than shown in FIG. 3.

As described with respect to FIG. 1, the management server 108 may include (or have access to) a dedicated scheduling mailbox 106 for scheduling all of the managed conferencing equipment. The mailboxes for the various conferencing equipment may be configured (e.g., by a user, or programmatically, e.g., by the management server) to forward scheduling information (e.g., emails and/or schedules) to the dedicated scheduling mailbox 106. The scheduling information may then be retrieved by the management server 108 and used to manage the conferencing equipment, e.g., as described further below.

FIG. 4

Figure 4:
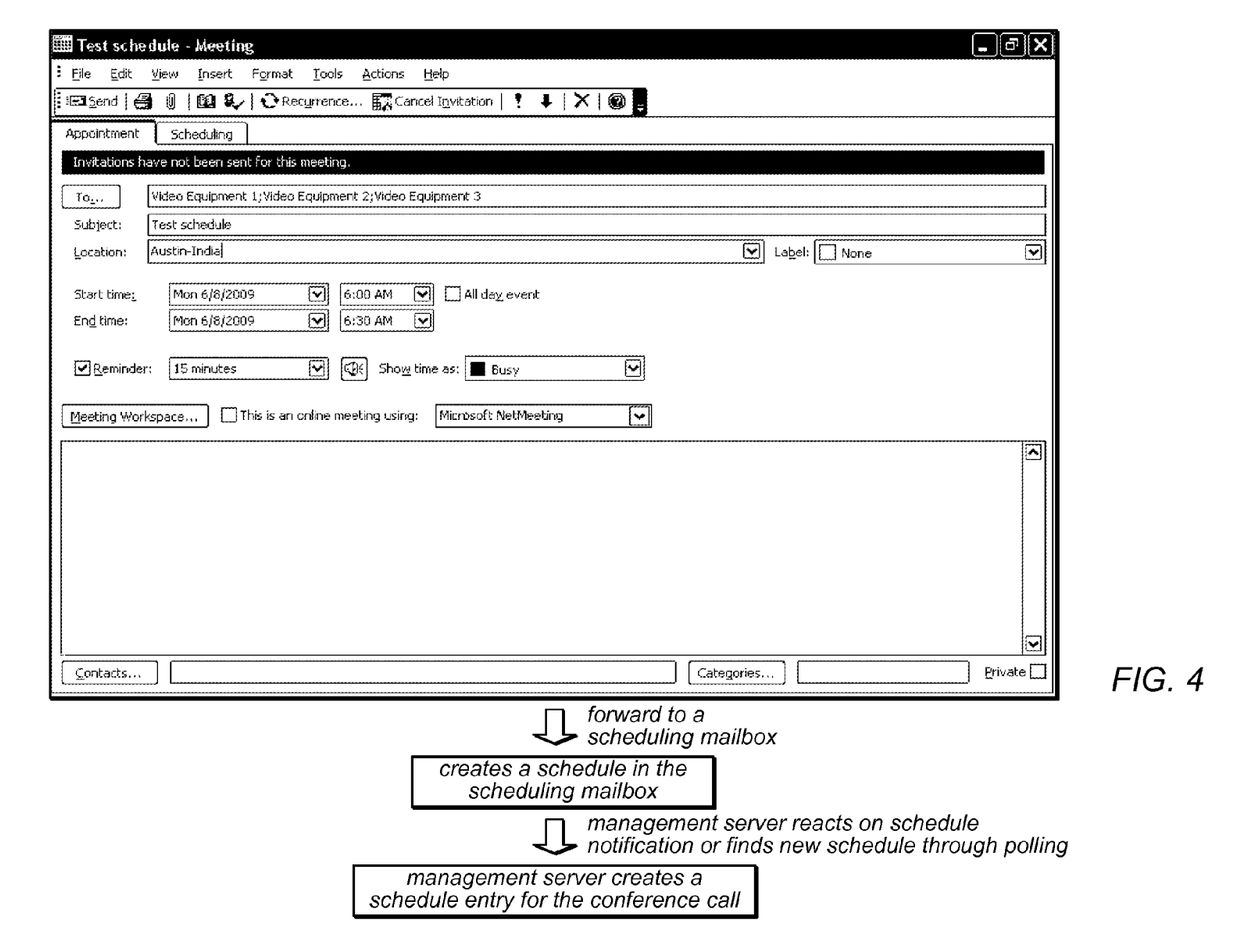
FIG. 4 illustrates part of a method for scheduling a video meeting according to one embodiment.

FIG. 4 illustrates part of the process of scheduling a videoconference according to one embodiment. In particular, FIG. 4 shows an exemplary email including scheduling information which might be sent by a user in order to schedule a videoconference. As shown, the email includes information for scheduling an appointment between multiple locations (e.g., "Austin-India") with certain conferencing equipment (e.g., "Video Equipment 1; Video Equipment 2; Video Equipment 3"), including a time and duration for the appointment (e.g., "Mon Jun. 8, 2009 6:00 AM to 6:30 AM"). Appointment- and meeting-setting functionality, such as shown in the exemplary email in FIG. 4, is common in numerous mail clients and widely used in many organizations. One of the key advantages of the present invention is that it may be integrated seamlessly and without hassle with existing scheduling mechanisms.

A user might send such an email to the mailboxes of the conferencing equipment in question. The email may then be forwarded from the mailboxes of the conferencing equipment to the dedicated scheduling mailbox (e.g., as described with respect to FIG. 3), where a corresponding schedule may be created. The management server may then find the new schedule in the dedicated scheduling mailbox, e.g., either based on a notification or by polling the mailbox. Depending on the feasibility of the created schedule, (e.g., based on a decision sequence such as shown in FIG. 5), the management server may then create a corresponding entry for the videoconference in the schedule it maintains for the managed conferencing equipment.

According to one embodiment, the user may indicate a preference for certain equipment to host the videoconference based on the order in which they are included in the schedule. For example, in one embodiment the management server may choose the first endpoint in the list which is capable of hosting the videoconference as the host. Alternatively, if multipoint equipment is required, the user may specify a preferred multipoint host (which could include an endpoint with inbuilt multipoint capability) by including the multipoint unit mailbox as a recipient of the scheduling email. If no particular equipment is specified by the user in this way, or if the preferred equipment is not capable of hosting the multipoint call, the management server may choose other equipment, or the schedule may not be possible. Other ways of specifying preferred hosting equipment are also envisioned. Further details of the decision sequence used by the management server to determine the host(s) and schedule the call are given below with respect to FIG. 5.

FIG. 5

Figure 5:
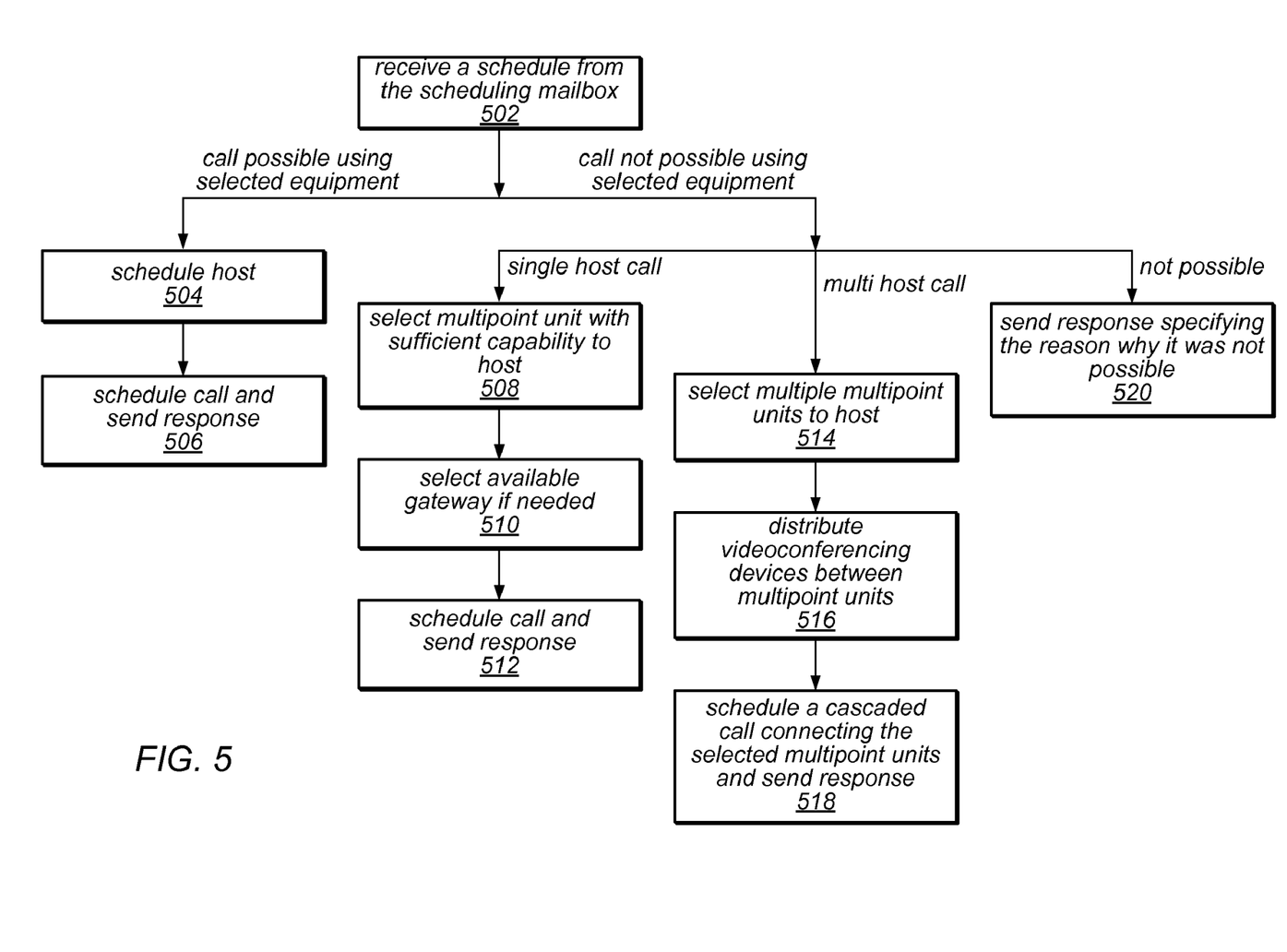
FIG. 5 illustrates a decision sequence for a management server scheduling a videoconference according to one embodiment.

FIG. 5 is a diagram illustrating a decision sequence which the management server may undergo upon receiving scheduling information for a conference call (e.g., a videoconference) from the common scheduling mailbox. The decision sequence shown in FIG. 5 may be used in conjunction with any of the systems, devices, and/or methods shown in and described with respect to the other Figures. In various embodiments, some of the steps shown may be performed concurrently, performed in a different order than shown, or omitted. Additional method elements may also be performed as desired. As shown, this decision sequence may operate as follows.

In 502, the management server may receive a schedule from the scheduling mailbox. In some embodiments, the management server may in fact actively retrieve the schedule from the scheduling mailbox; for example, the management server may periodically poll the scheduling mailbox to find new schedules, or the scheduling mailbox may send a notification to the management server that a new schedule has been received, so that the management server may retrieve the schedule. The management server may then check whether the schedule is possible, and if it is possible, whether it is possible using the preferred equipment (if any preferred equipment is listed). Depending on the determination, the management server may follow one of the flows starting in steps 504, 508, 514, or 520.

If the call is possible using the selected (preferred) equipment, the management server may follow the flow starting in step 504.

In 504, the management server may schedule the selected host to host the videoconference at the selected time.

In 506, the management server may schedule the call and send a response confirming the scheduled conference call to each conference participant. In some embodiments, further action may be taken depending on any responses from the conference participants; such possible actions are described further below with respect to FIG. 6.

If the call is not possible using the selected (preferred) equipment, or if no preferred equipment is specified, the management server may follow one of the flows starting in steps 508, 514, or 520. There might be any number of reasons why the call would not be possible using the selected equipment. For example, in making a determination of whether the call is possible as scheduled, the management server might check for down times, conflicts, and/or capability problems. If the preferred equipment is scheduled for down time or will be hosting another conference call at the desired time, the call may not be possible as scheduled. Likewise, if the selected host does not have the capability (e.g., the capacity or the compatibility) to host the conference call, the call may not be possible as scheduled. In various embodiments, if the conference call is not possible as scheduled, it may still be possible using different equipment, or may not be possible.

If the conference call is possible using a single host, the management server may follow the flow starting in 508.

In 508, a multipoint unit with sufficient capability may be chosen to host the call. The chosen multipoint unit may be one that is capable of hosting the number and type of endpoints that will be involved in the conference call. The management server's choice of an appropriate multipoint unit might be based on one or more predetermined settings, such as a preferred order list for multipoint equipment, and/or other settings. The predetermined setting(s) might be set by an administrator, or alternatively could include one or more default settings.

In 510, a gateway for the selected multipoint unit may be selected, if one is needed.

In 512, the management server may schedule the call and send a response confirming the scheduled videoconference to each conference participant. As in step 506, in some embodiments, further action may be taken depending on any responses from the conference participants; such possible actions are similarly described further below with respect to FIG. 6.

If the conference call is possible using multiple hosts, the management server may follow the flow starting in step 514.

In 514, multiple multipoint units may be chosen to host the call. The multipoint units may be chosen and cascaded in such a way as to achieve optimal call topology, either by using endpoints with inbuilt multipoint capabilities, or else with dedicated multipoint capable units.

In 516, the videoconferencing devices (endpoints) may be distributed between multipoint units, again in such a way as to achieve optimal call topology. Thus, the endpoints may be distributed based on affinity, vicinity, and so on.

In 518, the management server may schedule the cascaded call involving the multiple multipoint units and send a response confirming the scheduled videoconference to each conference participant. As in steps 506 and 512, in some embodiments, further action may be taken depending on any responses from the conference participants; such possible actions are similarly described further below with respect to FIG. 6.

If the conference call is not possible, for example if the network does not include enough multipoint equipment to host the call, or there is not enough multipoint equipment available at the time of the call due to scheduling conflicts or equipment downtime, the management server may proceed to the flow beginning at step 520.

In step 520, the management server may send a response to the user who initially sent the scheduling email (or, in some embodiments, to each conference participant) specifying the reason why it was not possible to schedule the videoconference. The user may then be able to find an alternative to the scheduled videoconference, e.g., by rescheduling the videoconference or another conflicting videoconference, changing the properties of the conference (e.g., the number of endpoints), upgrading the videoconferencing equipment to support the videoconference, and/or with another solution.

FIG. 6

Figure 6:
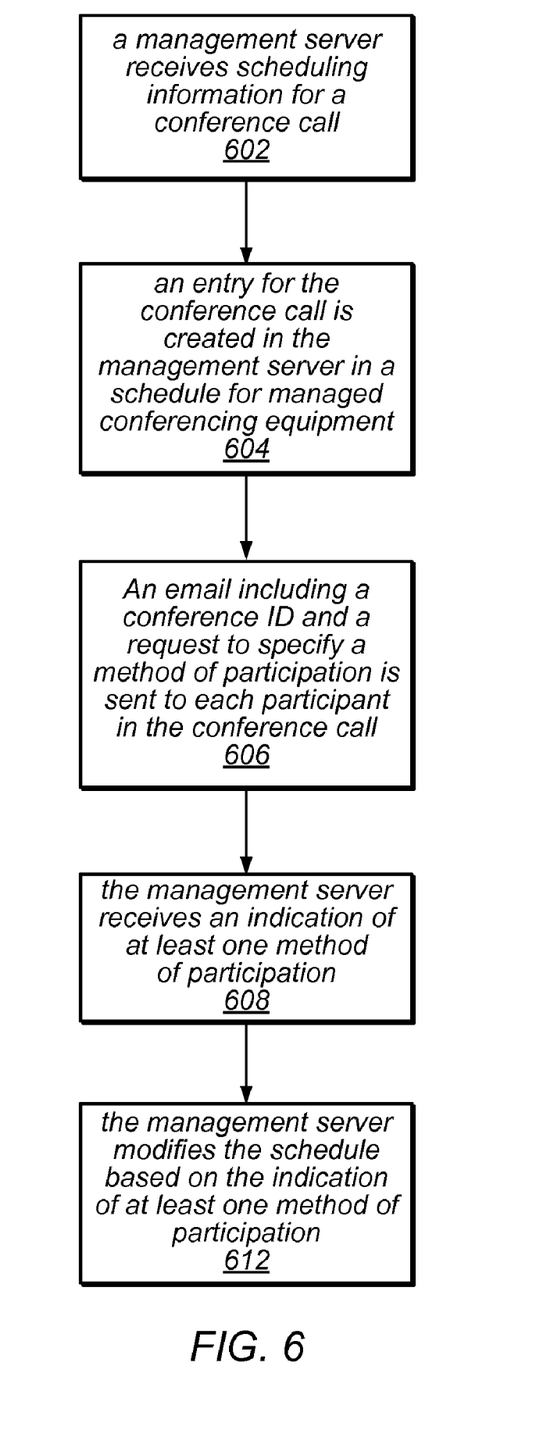
FIG. 6 is a flowchart diagram illustrating a method for scheduling a videoconference according to one embodiment.

FIG. 6 is a flowchart diagram illustrating a method for scheduling a conference call, e.g., a videoconference call. The method shown in FIG. 6 may be used in conjunction with any of the systems, devices, and/or methods shown in and described with respect to the above Figures. In various embodiments, some of the method elements shown may be performed concurrently, performed in a different order than shown, or omitted. Additional method elements may also be performed as desired. As shown, this method may operate as follows.

In 602, a management server may receive an email including scheduling information for a conference call. The scheduling information may be received at a dedicated scheduling mailbox which may be on the management server or accessible to the management server. For example, as shown in FIG. 3, the scheduling mailbox may receive forwarded emails with scheduling information from the mailboxes of any conferencing equipment managed by the management server. In this case, the scheduling information may be sent to the scheduling mailbox by a user indirectly, i.e., the scheduling information may be sent by the user to a mailbox of conferencing equipment which the user desires to use for the conference call, and the mailbox of the conferencing equipment may forward the scheduling information to the scheduling mailbox. Alternatively, in some embodiments the scheduling information may be emailed directly to the scheduling mailbox by the user who is organizing the conference call.

The scheduling information may specify a time and two or more endpoints for the conference call. The scheduling information may also include additional information, such as an expected duration of the conference call, the participant locations and/or users, and any specific or preferred equipment (e.g., multipoint equipment) that should be used for the conference call if possible. Other information may also be included in the scheduling information, according to some embodiments.

The management server may determine whether the conference call is possible, including checking whether the conference call is possible using any preferred conferencing equipment indicated in the scheduling information. As part of managing the conferencing equipment, the management server may maintain its own schedule for all of the managed conferencing equipment. For example, in one embodiment, the schedule may include a scheduling database located on the management server. As part of determining whether the conference call is possible, the management server may check the scheduling information against its own schedule for the managed conferencing equipment. For example, based on the schedule for the managed conferencing equipment, the management server may be able to determine if there are any equipment downtimes or conflicts with other scheduled conference calls that would interfere with the conference call. Thus, the management server may first determine if the preferred hosting equipment is suitable to host the conference call. If the preferred equipment is both capable of and available to host the conference call, the management server may go ahead with the scheduling; if the preferred host is determined to not be suitable to host the conference call, the management server may check that there is enough managed equipment available which is capable of hosting the conference call (either with a single host or by cascading multiple hosts), and determine one or more alternate or additional hosts which are suitable to host the conference call. The decision sequence shown in FIG. 5 and described above with respect thereto provides more details as to the management server's determination of whether the conference call is possible, according to one embodiment. In some embodiments, as part of determining whether the conference call is possible, the management server may also determine whether all of the requested endpoints are available at the time requested. If the conference call is determined to be possible, the management server may proceed to step 604. As noted with respect to FIG. 5, if the conference call is determined to not be possible, the management server may send a response email to the user from whom the scheduling information originated (e.g., the organizer of the conference call), indicating that it was not possible to schedule the conference call as requested, and/or one or more reasons why it was not possible to schedule the conference call as requested.

In step 604, the management server may create an entry for the conference call in its schedule for the managed conferencing equipment.

In 606, the management server may send an email confirming that the conference call has been scheduled to each participant (e.g., including both local and external participants) in the conference call. The confirmation message may also indicate some or all of the equipment (e.g., endpoints, MCUs, gateways, etc.) which is scheduled to be included in the conference call. In some embodiments, the confirmation email may include including a unique conference ID number or code. The confirmation email may also include a request or allow for the possibility that each participant in the conference call specify a method of participation. For example, a participant might specify an IP address or DNS name, an ISDN number, a PSTN number, an SIP URL, an OCS URL, or any other mechanism to join the conference.

Depending on the participants, the conferencing equipment to be used, and the detail of the original scheduling information, it may not be necessary that any participants actually reply with a method of participation. For example, if all of the participants will use conferencing equipment which is managed by the management server, and the scheduling information included all of the equipment to be used (e.g., as may be indicated by the confirmation email, in those embodiments in which the confirmation email includes an indication of the scheduled conferencing equipment), the management server may not need any additional information to schedule and initiate the conference call.

Conversely, if not all of the equipment to be used is specified, or if the method of participation for some of the equipment is unknown to the management server, it may be necessary that one or more participants respond with a method of participation. For example, if an external participant is included in the conference call, that participant's conferencing equipment may not be managed by the management server. Thus, in that case, the external participant might respond with a method of participation (e.g., any of the methods described above, or another method). Other possible reasons for a participant to respond could include if the scheduling information included an incorrect method of participation for that participant (e.g., if their method of participation has changed or is incorrect in the scheduling information), or if the scheduling information initially received by the management server simply did not include that participant's method of participation.

In 608, the management server may receive an indication of at least one method of participation in the conference call. As noted above, such an indication might be from a local participant or an external participant. The indication may be an email, for example, an email responsive to a confirmation email sent by the management server.

In 610, the management server may modify the schedule based on the indication of at least one method of participation. The management server may first check whether it manages the equipment (e.g., IP or ISDN equipment) which the method of participation indicates. If it does manage the specified equipment, modifying the schedule may simply include adding the equipment to the conference call in the schedule, and/or changing the conferencing equipment for a particular location and/or participant of the conference call. If the management server does not manage the equipment, for example if the responding participant is an external participant, the management server may create an 'external equipment' entry for that participant. The management server may then include the external equipment in the conference call in its schedule for managed equipment. In some embodiments, an external participant's specified method of participation (e.g., including the created external equipment entry) may be remembered (e.g., stored in memory) by the management server, and may be used automatically for subsequent conference call scheduling and in subsequent conference calls. In some embodiments, modifying the schedule may include modifying the call topology, e.g., if the previous call topology is no longer suitable or possible, or a different call topology would be more suitable in light of change(s) in the conferencing equipment to be used in the conference call.

Once the management server has modified the schedule entry for the conference call to include each participant's specified method of participation, the entry for the conference call may be complete. In some embodiments, at the time specified for the conference call, the management server may initiate the conference call. The management server may initiate the conference call automatically (e.g., without user input specifying that the management server initiate the conference call), based on the management server's schedule for managed conferencing equipment. This may include automatically sending commands to one or more endpoints (e.g., videoconferencing systems) and/or multipoint units to establish connections between the participants according to the specified methods of participation. For example, in one embodiment, the management server may send one or more emails including executable commands to the mailbox(es) of one or more endpoints and/or multipoint units. Further description and examples of such a method of initiating a videoconference are provided in application Ser. No. 12/389,902, titled "Email Based Remote Management of Network Connected Entities", filed Feb. 20, 2009, whose inventors are Gautam Khot, Prithvi Ranganath, Raghuram Belur, and Sandeep Lakshmipathy, which is hereby incorporated by reference in its entirety as though fully and completely set forth herein. Other methods of initiating the conference call are also envisioned.

Advantages of the Method

The embodiments of a method for scheduling conference calls described herein present several advantages over prior solutions for scheduling conference calls.

The method utilizes a common scheduling mechanism, e.g., email based appointments; because this functionality is already existent and familiar to many users and organizations, it requires minimal specific training. In addition, it doesn't require a dedicated mail client plug-in, so the client that could be scheduling a conference call could be a computer system using any operating system, or even a handheld device (such as a BlackBerry™ (provided by RIM) or other mobile device) which has a mail client.

The method also does not require installation of a specific mail server plug-in. This simplifies deployment considerably, and avoids any risk of causing downtime on the mail server. It also eliminates any dependency on a specific type of mailbox server. In other words, because the method may only rely on the basic premise of having a common scheduling mailbox to which scheduling emails can be forwarded, the method may also be independent of mail system specific issues. For example, if an administrator wants to change (e.g., upgrade) a mail system (e.g., from Microsoft® Exchange 2003 to Microsoft® Exchange 2007), a prior art conferencing scheduling system which relies on mail server specific plug-in may not immediately be compatible with the new mail system, but the method described herein would not be affected.

Additionally, the method provides a straightforward way to include participants external to an organization's network who are connecting from an endpoint that is not managed by the organization's management suite. Because the management server includes a mechanism to automatically send a request for external participants to specify their method(s) of participation, and the management server can automatically update its schedule and equipment database to recognize the specified equipment, it may be unnecessary for an administrator to manually enter the external equipment into the system. Further, because the external participant is specifying their method of participation, it is less likely that the method of participation will change at the time of the actual call and correspondingly may again require less administrator support. In addition, if the scheduling system already includes all of the scheduling details for the external endpoint, the system may be able to best determine appropriate call parameters before the conference call is launched, which may result in a better call completion ratio than might otherwise be expected. Thus, the improved system for including external participants in conference calls can enable easier communication between organizations.

An additional possibility presented by the method includes providing a stepping stone for hosted/managed services involving rented equipment and scheduling. More specifically, an organization which rents conferencing equipment could use such a scheduling mechanism to integrate their scheduling with respect to different customers; for example, each customer could send and receive scheduling emails to and from the organization's scheduling mailbox regardless of their mail client, thereby enabling automated integrated scheduling of the rented equipment for all of the organization's clients.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A computer-implemented method for a management server to schedule a conference call, wherein the management server manages conferencing equipment, the method comprising:
   receiving, by the management server, an email comprising scheduling information for the conference call, wherein the scheduling information specifies a time and two or more endpoints for the conference call, wherein the managed conferencing equipment comprises at least one of the two or more endpoints;
   determining, by the management server, whether the conference call is possible based on the scheduling information and a schedule for the managed conferencing equipment;
   if the conference call is determined to be possible:
      scheduling the conference call by the management server, wherein scheduling the conference call comprises entering the scheduling information in the schedule for the managed conferencing equipment;
      sending, by the management server, a message to each participant in the conference call requesting that each participant specify a method of participation in the conference call;
      receiving, by the management server, an indication of a method of participation in the conference call from at least one participant;
      modifying, by the management server, the schedule for the managed conferencing equipment based on the method of participation indicated by the at least one participant.

2. The method of claim 1, further comprising, if the conference call is determined to be possible, than:
   at the specified time, the management server automatically initiating the conference call based on the scheduling information in the schedule for the managed conferencing equipment.

3. The method of claim 1,
   wherein said determining whether the conference call is possible comprises checking the schedule for the managed conferencing equipment for one or more of:
   down times of any relevant conferencing equipment;
   conflicts with other scheduled conference calls; or
   capability to host the conference call.

4. The method of claim 1,
   wherein the management server comprises a dedicated scheduling mailbox, wherein the email comprising the scheduling information is received by the dedicated scheduling mailbox.

5. The method of claim 1,
   wherein receiving scheduling information for the conference call comprises receiving a forwarded email from at least one of the two or more endpoints.

6. The method of claim 1, wherein the scheduling information specifies a preferred host for the conference call, further comprising:
   determining, by the management server that the preferred host is suitable to host the conference call.

7. The method of claim 1, wherein the scheduling information specifies a preferred host for the conference call, further comprising:
   determining, by the management server, that the preferred host is not suitable to host the conference call;
   determining, by the management server, at least one alternate host which is suitable to host the conference call.

8. The method of claim 1, wherein the scheduling information is received from a user, the method further comprising:
   sending, by the management server, an indication to the user indicating whether the conference call is possible.

9. The method of claim 1, wherein the at least one participant is an external participant using conferencing equipment which is not managed by the management server, further comprising:
   receiving, by the management server, the indication of the method of participation in the conference call from the external participant, wherein the indication indicates that the external participant is using the conferencing equipment which is not managed by the management server;
   creating, by the management server, an external equipment entry based on the indication of the method of participation, wherein the external equipment entry enables the management server to include the conferencing equipment which is not managed by the management server in the conference call.

10. The method of claim 1,
    wherein the schedule for managed conferencing equipment comprises a database comprised in the management server.

11. A non-transitory computer readable memory medium comprising program instructions for managing videoconferencing equipment, wherein the program instructions are executable to:
    store a schedule for the managed videoconferencing equipment;
    receive an email comprising scheduling information for a videoconference, wherein the scheduling information specifies a time and two or more endpoints for the videoconference, wherein the managed videoconferencing equipment comprises at least one of the two or more endpoints;
    determine whether the videoconference is possible based on the scheduling information and the schedule for the managed videoconferencing equipment;
    if the videoconference is determined to be possible:
       schedule the videoconference, wherein scheduling the videoconference comprises entering the scheduling information in the schedule for the managed videoconferencing equipment;
       send a message to each participant in the videoconference requesting that each participant specify a method of participation in the videoconference;
       receive an indication of a method of participation in the videoconference from at least one participant;
       modify the schedule for the managed conferencing equipment based on the method of participation indicated by the at least one participant.

12. The computer readable memory medium of claim 11, wherein the program instructions are further executable to:
    if the videoconference is determined to be possible, automatically initiate the videoconference based on the scheduling information in the schedule for the managed videoconferencing equipment.

13. The computer readable memory medium of claim 11, wherein the program instructions executable to determine whether the videoconference is possible are executable to:
   check the schedule for the managed videoconferencing equipment for one or more of:
      down times of any relevant videoconferencing equipment;
      conflicts with other scheduled videoconferences; or
      capability to host the videoconference.

14. The computer readable memory medium of claim 11, wherein the program instructions are further executable to:
   store a dedicated scheduling mailbox, wherein the email comprising the scheduling information is received by the dedicated scheduling mailbox.

15. The computer readable memory medium of claim 11, wherein the program instructions executable to receive scheduling information for the videoconference are executable to:
   receive a forwarded email including the scheduling information from at least one of the two or more endpoints.

16. The computer readable memory medium of claim 11, wherein the scheduling information specifies a preferred host for the videoconference, wherein the program instructions are further executable to:
   determine that the preferred host is suitable to host the videoconference.

17. The computer readable memory medium of claim 11, wherein the scheduling information specifies a preferred host for the videoconference, wherein the program instructions are further executable to:
   determine that the preferred host is not suitable to host the videoconference;
   determine at least one alternate host which is suitable to host the videoconference.

18. The computer readable memory medium of claim 11, wherein the scheduling information is received from a user, wherein the program instructions are further executable to:
   send an indication to the user indicating whether the videoconference is possible.

19. The computer readable memory medium of claim 11, wherein the at least one participant is an external participant using external videoconferencing equipment which is not comprised in the managed videoconferencing equipment, wherein the program instructions are further executable to:
   receive the indication of the method of participation in the videoconference from the external participant, wherein the indication indicates that the external participant is using the external videoconferencing equipment;
   create an external equipment entry based on the indication of the method of participation, wherein the external equipment entry enables the management server to include the external videoconferencing equipment in the videoconference.

20. The computer readable memory medium of claim 11, wherein the schedule for the managed conferencing equipment comprises a database.

21. A system, comprising:
   a processor;
   a network port coupled to the processor, wherein the network port is configured to couple to a network; and,
   a memory medium coupled to the processor which stores program instructions for managing videoconferencing equipment, wherein the program instructions are executable by the processor to:
   store a schedule for the managed videoconferencing equipment;
   receive an email comprising scheduling information for a videoconference, wherein the scheduling information specifies a time and two or more endpoints for the videoconference, wherein the managed videoconferencing equipment comprises at least one of the two or more endpoints;
   determine whether the videoconference is possible based on the scheduling information and the schedule for the managed videoconferencing equipment;
   if the videoconference is determined to be possible:
      schedule the videoconference, wherein scheduling the videoconference comprises entering the scheduling information in the schedule for the managed videoconferencing equipment;
      send a message to each participant in the videoconference requesting that each participant specify a method of participation in the videoconference;
      receive an indication of a method of participation in the videoconference from at least one participant;
      modify the schedule for the managed conferencing equipment based on the method of participation indicated by the at least one participant.

* * * * *